FILTERING EFFICIENCY CURVE

I. $Co(OH)_3$ ; $t = 50°\,C$

Precipitated from cobalt chloride solution by means of zinc hydroxide suspension $2CoCl_3 + 3Zn(OH)_2 = 2Co(OH)_3 + 3ZnCl_2$ II. $Zn(OH)_2$ ; $t = 50°\,C$ Precipitated from zinc chloride by calcium hydroxide suspension, as in the end solution obtained from chlorinated roasted burnt pyrites $ZnCl_2 + Ca(OH)_2 = Zn(OH)_2 + CaCl_2$

FIG. I.

INVENTORS
Heinrich Schackmann
Carl Kayser
Horst Albrecht

United States Patent Office 2,991,884
Patented July 11, 1961

2,991,884
FILTRATION OF SLUDGES
Heinrich Schackmann, Carl Kayser, and Horst Albrecht, Duisburg, Germany
Filed Oct. 8, 1956, Ser. No. 614,598
2 Claims. (Cl. 210—73)

This invention relates to improvements in the filtration of sludges, and more particularly of those sludges which present particular filtration problems, especially sludges of metal hydroxide precipitates. Such sludges are known as voluminous and compressible, and in some respects they may also be said to be amorphous and colloidal, as well as non-crystalline, and perhaps slimy.

Typical examples of such voluminous and compressible sludges are $Zn(OH)_2$, $Ca(OH)_2$, $Co(OH)_3$, and with respect to the specific filtration problems which they present, and for the purpose of this invention, they should be contrasted with sludges which are substantially crystalline and non-compressible, representative examples of which are sludges of coal, cement, and of ore, also sludges of magnesium carbonate, glass, ceramic substance, and bleaching earths.

It is well known that each such voluminous compressible sludges are very difficult to filter especially on the external type of continuous rotary filter, and that it is therefore generally necessary to filter them on filter presses necessitating relatively high pressures and tedious batch operation. (See Ost-Rassow, Lehrbuch der Chemischen Technology, 20th ed., p. 324.)

In the discussion of the rotary drum-filters that textbook states that these continuous rotary drum filters are suited for handling fine-crystalline substances such as magnesium carbonate and the like, also for calcium sludges and coal sludges if not too finely grained, also, for example, clays, ceramic substances, and for bleaching earths, but they are considered unsuited for handling precipitates having the voluminous, compressible, colloidal-amorphous, non-crystalline characteristics above indicated.

Therefore, a longstanding problem resides in the fact that such voluminous and compressible sludges of precipitates of metal hydroxides were substantially unfilterable upon other than the intermittently operating filter presses. With respect to using the economically and operationally more desirable continuous external drum filters, only the addition of certain filter aids would render such sludges filterable, if at all.

Again, such filter aids would act as a contaminant where the filter cake itself represents the substance or value to be recovered in a state of maximum attainable purity. Hence, the only other alternative, if any, was to operate the external drum-filter at extremely low capacity with the formation of a precariously thin filter cake. Therefore, because of the abovementioned characteristics of these sludges, workers in the art were confined to producing at best only a filter blanket upon the drum, so thin as to make continuous operation extremely difficult if not impossible, because of the resistance of such blanket to liquid permeation as well as because of the practical difficulties in continuously stripping or scraping off such a thin cake encountered. In typical instances (as with $Zn(OH)_2$, $Ca(OH)_2$ and $Co(OH)_3$) a blanket thickness for instance in the order of $\frac{1}{16}''$ was the best to be expected.

Consequently, it is among the objects of this invention to render sludges of that type filterable in a continuous economical manner upon external rotary drum filters, without necessitating the use of filter aids, avoiding the use of filter presses. That object has here been attained by the discovery that continuous filtration of such sludges is practicable because of newly discovered favorable characteristic ratios of sludge concentratability versus filterability so that also an economically favorable ratio can be established as between the expenditures or efforts for concentrating such sludges to a degree higher than heretofore thought economically feasible, and the gain in continuous filtration efficiency upon the external drum filter with continuous cake stripping.

This invention in practical filter operation is based upon the discovery that sludges, even those which seem to offer the greatest inherent practical filtration problems, such as the metal hydroxide precipitates can in fact be filtered economically and successfully upon the external rotary drum filter as distinct from filter presses.

That discovery is best graphically expressed by a filtration efficiency curve with feed sludge concentration on the abscissa, and cake formation on the ordinate, that is grams of solids per liter of feed sludge on the abscissa and kg. of cake solids per square meter of filter surface in the ordinate.

It has long been known in the filtration of the non-compressible crystalline sludges to apply the feed sludge to a continuous drum filter at a suitable high concentration to improve filtration efficiency in proportion or even disproportionately.

Depending upon the characteristics of these normally filterable sludges such known filtration efficiency curves may represent a substantially linear function, or they may to some extent be convexly curved relative to the abscissa indicating a disproportionate increase in filtration efficiency with increase of feed sludge concentration. Hence, there has been little difficulty in continuously filtering such sludges as contrasted with the voluminous compressible metal hydroxide precipitates.

The invention lies in the discovery that by concentrating these metal hydroxide precipitates sufficiently beyond the point or range normally considered practical and economical, that is beyond the conventional range of 300 x 400 g./l. moist substance, namely to a solids content of about 600 g./l. moist substance and even to about 800 g./l. or more, f.i. to 1400 g./l. the filterability or liquid permeability of the cake is changed unexpectedly and abruptly, whereby economical vacuum filtration on continuous external drum filters becomes practicable. In other words, from being normally unfilterable except on filter presses under high pressure, the characteristics of these sludges change from forming compressible filter cakes unsuited for drum filters to becoming continuously filterable on continuous external vacuum drum filters. In sludge of the $Zn(OH)_2$ type, if concentrated or thickened to about 600 g./l. moist weight or about 250 to 300 g./l. dry substance, will thereby attain what is herein termed the incipient critical filterability definable by a steeply ascending portion of the filtration efficiency curve following a break. Thus, it should be understood that the efficiency curves herein dealt with are to be considered specifically in terms of continuous filterability on a rotary drum filter. When so considered, it is a startling discovery that for instance the filterability characteristics of a $Zn(OH)_2$ sludge are representable by a curve comprising a shallow ascending relatively linear initial portion and a relatively sharp break followed by steeply ascending relatively linear outer end portion. Considering the $Zn(OH)_2$ filtration efficiency curve from that viewpoint, that curve then assumes the aspect of what should be termed a "filterability" curve in view of the fact that, in terms of continuous rotary drum operation, that sludge is practically unfilterable at concentrations corresponding to the shallow ascending portion preceding the break, but becomes abruptly and economically filterable along the steeply ascending portion following the break. Hence, in terms of rotary drum operation the initial portion preceding the break of that curve is in reality non-existent, while the existence of the break with the subsequent steeply ascending portion represents the discovery of a concentration range heretofore unknown in industrial filtration practice for such sludges, within which range continuous filtration becomes feasible economically. Hence the discovery requires that the voluminous compressible sludges in question be subjected to a super concentration or super-thickening treatment exceeding that which was heretofore customary or considered economically attainable in connection with the filtration treatment of these sludges.

It is furthermore within the scope of this discovery that the break or incipient filterability increase is determinable for the type of voluminous compressible sludges here in question by means of a stationary test filter plate or vacuum filter cell placed in a suspension of the respective precipitate, with the filter cloth facing downwardly, while the cell is being moved uniformly in the suspension to stimulate continuous drum filter operation. By sequentially applying prepared suspensions of the material of increasing concentration, the filter efficiency can be plotted as a function of the concentration including the break or incipient filterability increase.

The data have thus been found to be directly analogous to the filtration behavior of the sludge in continuous rotary drum operation, so that this test curve thus becomes a "filterability" curve defining that concentration range at which continuous drum filtration becomes practicable and economically feasible in accordance with the discoveries of this invention. In this way by determining the break or incipient filterability increase for the suspended precipitate in question, there is ascertainable the continuous drum operating range that will produce cake thicknesses substantial enough to avoid the cake stripping and cloth clogging difficulties above referred to.

An example of such a determination is as follows:

The test filter cell connected to a constant suction line is immersed in the suspension or bath of pulp while being moved therein in a uniform manner, while maintaining Temperature _____° C__ 50
Vacuum _____mm__ 250
Times of suction _____sec__ 40

Such a test in fact produces filtration results close to those attainable by continuous filter drum operation, translatable into rotary filter operation. Therefore, with 33% immersion of the filter drum and a suction period of 40 seconds, the rotary speed of the drum would be 30 revolutions per hour to produce comparable filtration results.

In other words, a test filtration efficiency curve thus plotted for a representative voluminous compressible sludge such as $Zn(OH)_2$ would reveal the sharp break beyond which that suspension must be concentrated or super-thickened in order to avoid the use of batch operated filter presses, while rendering it economically suited for handling on the external rotary drum filter in continuous operation.

That is to say, such a filter cell test if interpreted in the sense of invention, reveals as in the case of $Zn(OH)_2$ sludge, the initial shallow portion of the test curve prior to the break comprises the conventionally attainable and accepted concentration range requiring batch filter press operation, whereas the steep ascending portion of the curve past the break comprises the newly discovered concentration range which opens the door to economically practical continuous rotary drum filter operation for such sludges.

Such metal hydroxide precipitates as $Zn(OH)_2$ and also $Ca(OH)_2$ represent drastic examples of the discovery underlying this invention because of the pronounced sharpness of breaks in the test filter curve as above defined, as well as because of the surprising degree of sudden "steepness" of the curve portion past the break. But of equal practical importance in that group of sludges is one which, such as $Co(OH)_3$, has an initial portion of comparable shallow incline as well as a final portion of comparable steepness, the break occurring at a higher feed concentration than in the examples of $Zn(OH)_2$ or $Ca(OH)_2$.

In the instance of such a voluminous compressible as is represented by a $Co(OH)_3$ type of sludge, the test curve may be said to have a primary controlling significance with respect to conducting continuous filter operation.

For the purpose of this invention, one may consider such filtration efficiency curves in terms of the continuous rotary drum filter operating ranges versus the conventional batch filter press operating ranges for the group or class of voluminous compressible sludges here under scrutiny, such contradistinction being presentable in the filtration curves herein presented.

For the respective sludges of voluminous compressible sludges a desired degree of concentration is attainable for instance by a mode of super thickening as disclosed in the co-pending patent application Serial No. 400,832, filed December 29, 1953, and now abandoned, and briefly outlined as follows:

Such super thickening to the desired degree can be realized, for example, in a thickener tank provided with a rotary raking structure that has rake arms provided with sets of plowing raking blades, and a central sludge outlet means in the tank bottom. In this instance, the construction of the rake structure and the mounting of the blades upon the rake arms, as well as the depth of the tank, are such as to allow for the formatiton of a zonewise thickening pattern which comprises an upper clarification zone, a subjacent or intermediate sedimentation zone, and at the bottom a sludge zone or sludge bed. That is to say, raking blades are carried by the rake arms and are downwardly spaced therefrom by means of stems, so that there can be practiced a method of thickening whereby the sludge in the sludge zone or sludge bed is accumulated to a height significantly beyond that of the raking blades, to be detained in the sludge for a length of time beyond the start of the so-called compression phase.

The rotation of the structure causes the raking blades to convey the sludge towards the central discharge while being subjected to continuous kneading in a mechanical kneading zone directly at the tank bottom. In this way, the sludge in the kneading zone is overlain by a sludge bed zone that is a sludge detention or storage zone not reached by the blades, while the rake arms operate at an elevation substantially clear of the sludge bed accumulation.

In the practice of this thickening method, the volume of sludge being conveyed to the discharge point, is greater than the volume being discharged, so that the excess sludge thus conveyed is caused to move again outwardly in a portion of the sludge bed that lies above the kneading zone proper. Whatever the thus induced movement of the sludge may be within the sludge bed, the sludge therein is thus continuously turned over to aid in the release of liquid therefrom yet to prevent the remixing of the sludge in the kneading and conveying zone with liquid from the aforementioned intermediate sedimentation zone.

Another mode of attaining greater than the conventional degree of concentration with such sludges is by employing for example the "Schraeg Eindicker" as disclosed and described in "Leitfaden der Erzaufbereitung" by Gerth, Salzmann, and Hamann, published by Bonner Universitaets-Buchdruckerei, Gebr. Schleur, G.m.b.H., 1952, page 152.

The following size analysis of zinc hydroxide sludge is an example of physical criteria of the type of voluminous compressible and amorphous precipitates covered by this invention. These analyses have been carried out by one of the sedimentation methods, namely the pipette method according to Andreasen, showing that the particle sizes per 100 weight percent lie below 50 μ. These size analyses are tabulated for zinc hydroxide sludge as follows.

ZINC HYDROXIDE SLUDGE

| Particle Size, κ | Weight, Percent |
|---|---|
| 0- 1.3 | 23.9 |
| 1.3- 3.6 | 11.0 |
| 3.6- 5.9 | 9.3 |
| 5.9-10.4 | 17.5 |
| 10.4-14.9 | 9.3 |
| 14.9-21.8 | 6.9 |
| 21.8-40.0 | 22.1 |
| | 100.0 |

The microscopic X-ray spectrographic examination of such sludges confirms the above size analyses, indicating that such sludges represent largely amorphous substances. An X-ray spectrogram of $Co(OH)_3$ shows the same amorphous structure, and similar characteristics are observed with $Ca(OH)_2$. At any rate, these analyses show that the physical characteristics of the sludge which are termed voluminous and are soft-compressible, differ radically from those which are readily filterable on drum filters, such as coal and ore.

In summary then, it is known that in contrast with non-compressible sludges, the voluminous compressible sludges may only be filtered with great difficulty. Filtering is generally effected with filter presses at increased pressure. It is generally not possible to use rotary external drum filters and the same when used are of only insufficient capacity. (See Ost Rassow, Lehrbuch der Chemischen Technologie, 20th Ed., page 324.)

One object of this invention is a new process for the filtration of voluminous compressible sludges which will allow the attaining of extremely high filtering efficiencies by a combination of super-thickening and continuous filter operation. This and still further objects will become apparent from the following description.

It has been very surprisingly found that voluminous thin sludge of the type herein considered each have a concentration of incipient critical filterability increase, i.e. a narrow limited concentration range which is well above 300–500 g./l./moist substance, which when reached will cause an exceedingly high increase of the filtering efficiency. This concentration of incipient efficiency curve by a point on the curve where the curve ascends steeply.

The concentration of incipient critical filterability increase according to this invention has been found to vary for each type of sludge depending upon its chemical nature and the type of precipitate contained therein. The concentration of incipient critical filterability increase is determined by plotting a filtering efficiency curve. This curve has the rate of filtration for a given filter area, as for example, in kilograms per square meter per hour plotted on the ordinate and the concentration of the sludge as for example, in grams per liter plotted on the abscissa. The concentration of incipient critical filterability increase is the concentration at which the curve begins to steeply ascend. Changes in temperature at which the sludges are filtered will only slightly change the position of the filtering efficiency curve as a whole, but will not substantially alter the characteristics of the curve or of the point of concentration of incipient critical filterability increase.

Exceedingly high filtering efficiencies are obtained with a given filter apparatus in accordance with the invention by concentrating the voluminous thin sludge to be filtered to at least the concentration of incipient critical filterability increase and thereafter filtering the concentrated sludge.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims or of forms that are their functional as well as conjointly cooperative equivalents, are therefore intended to be embraced by those claims.

The drawings show by way of example filtering efficiency curves for different types of sludges.

FIGURE 1 shows curve I being the filtering efficiency curve of a cobalt hydroxide sludge precipitated by means of a zinc-hydroxide suspension. Curve II is the filtering efficiency curve of a zinc hydroxide sludge precipitated by means of a calcium hydroxide suspension. These curves are plotted for moist cake substance.

Figure 4:
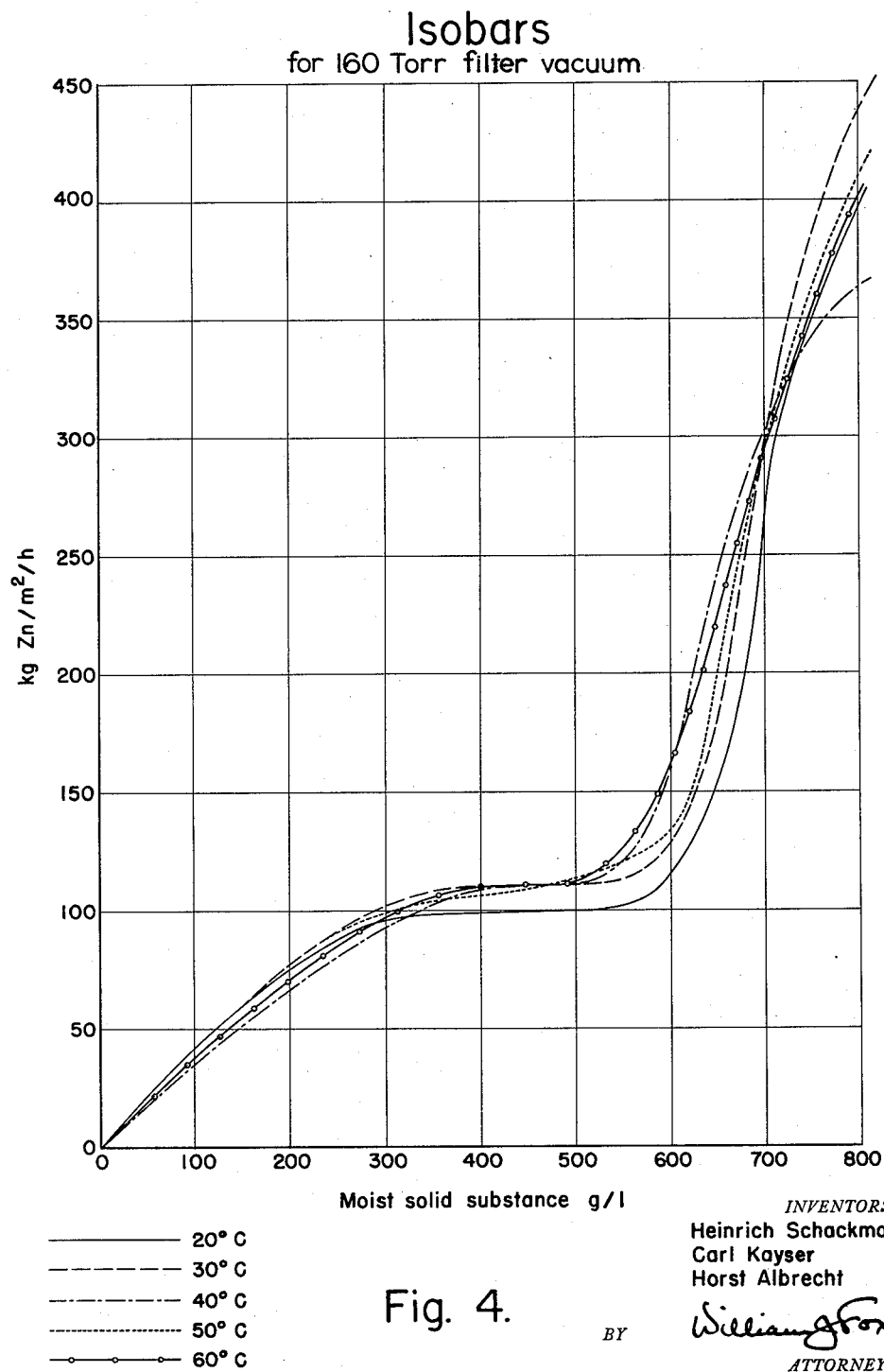
Figure 5:
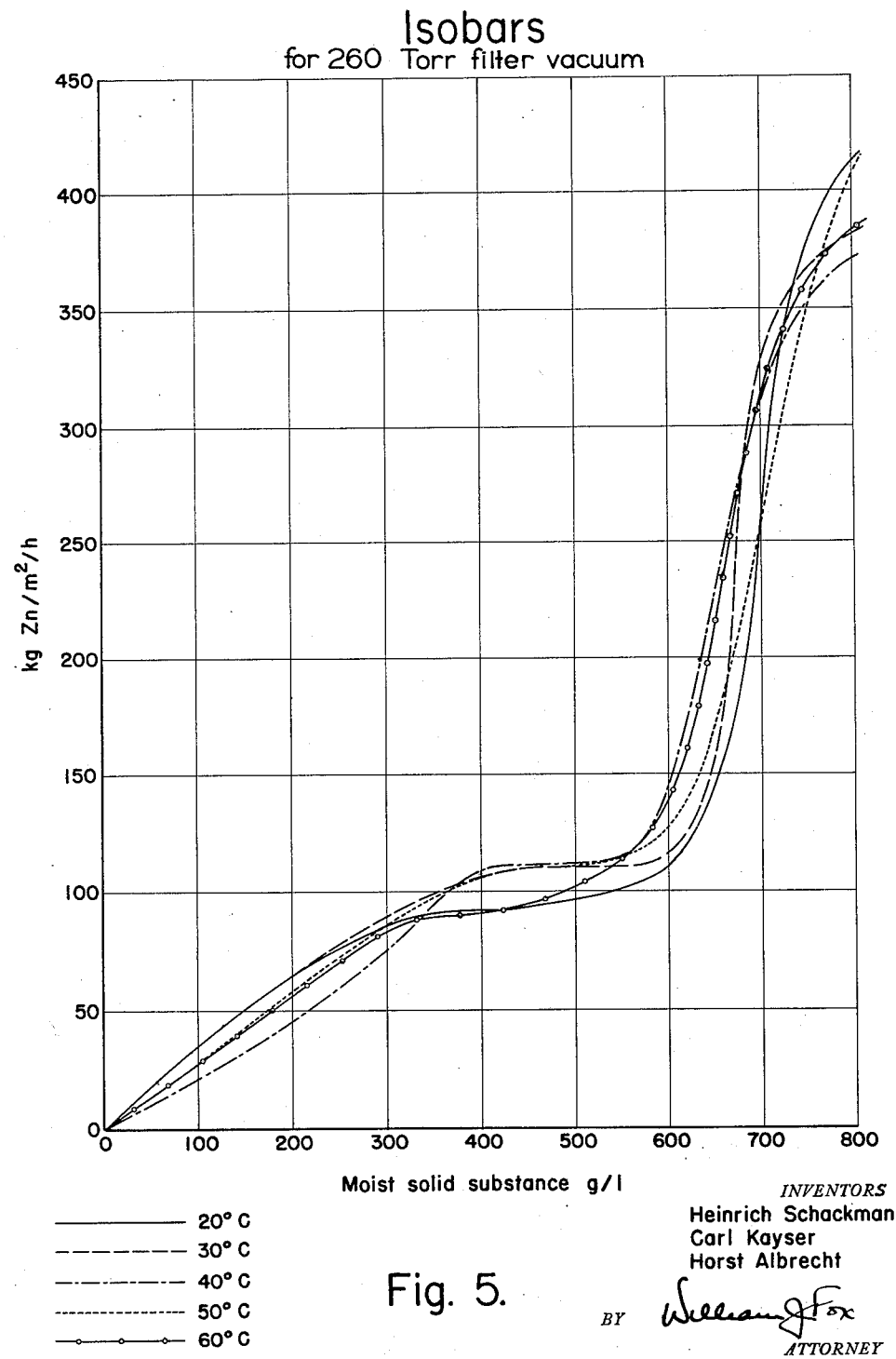
Figure 6:
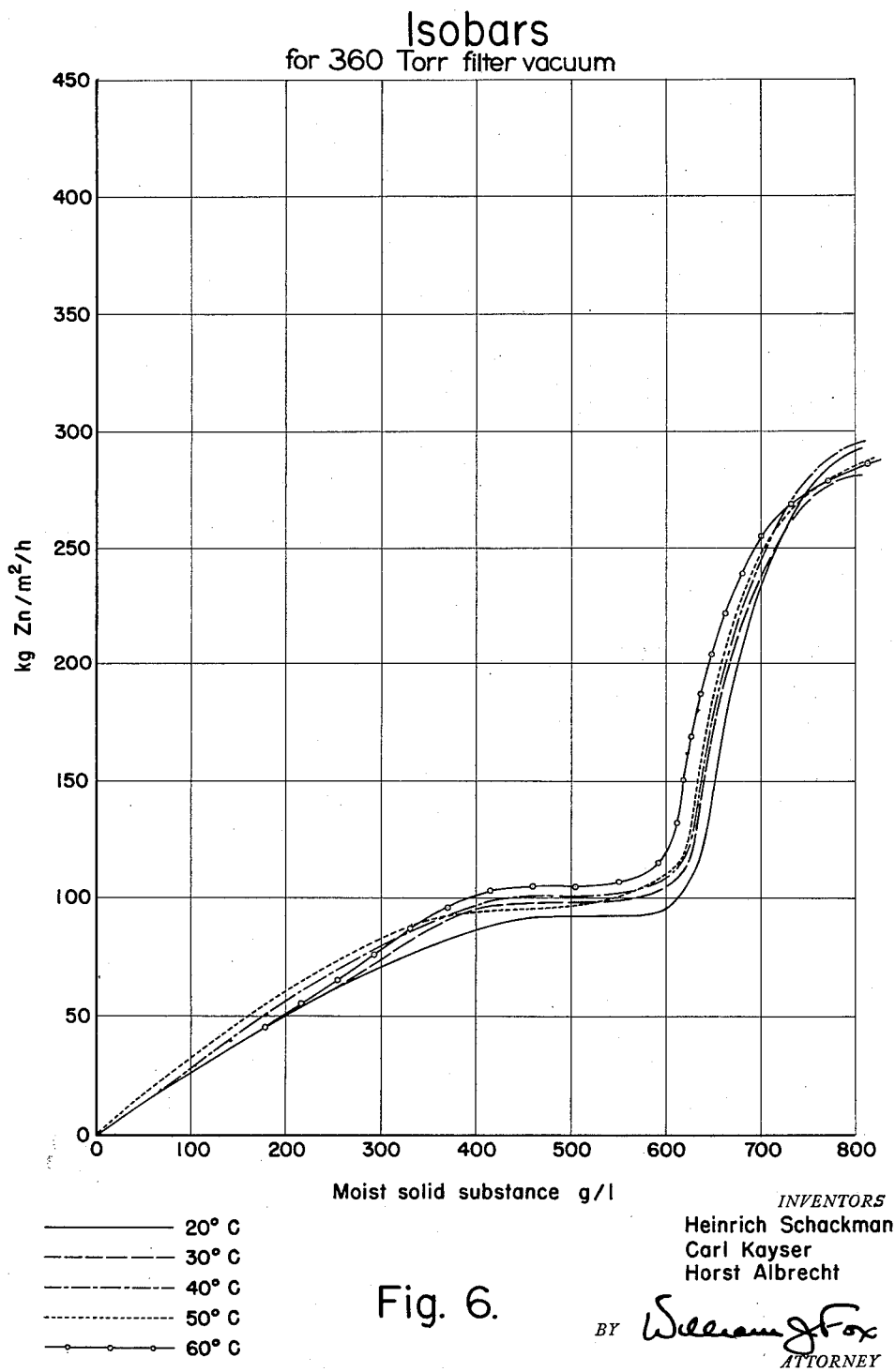

FIGURES 4, 5, and 6 are filtration efficiency curves plotted for $Zn(OH)_2$ for different filter vacuum conditions and different filtration temperatures.

Figure 7:
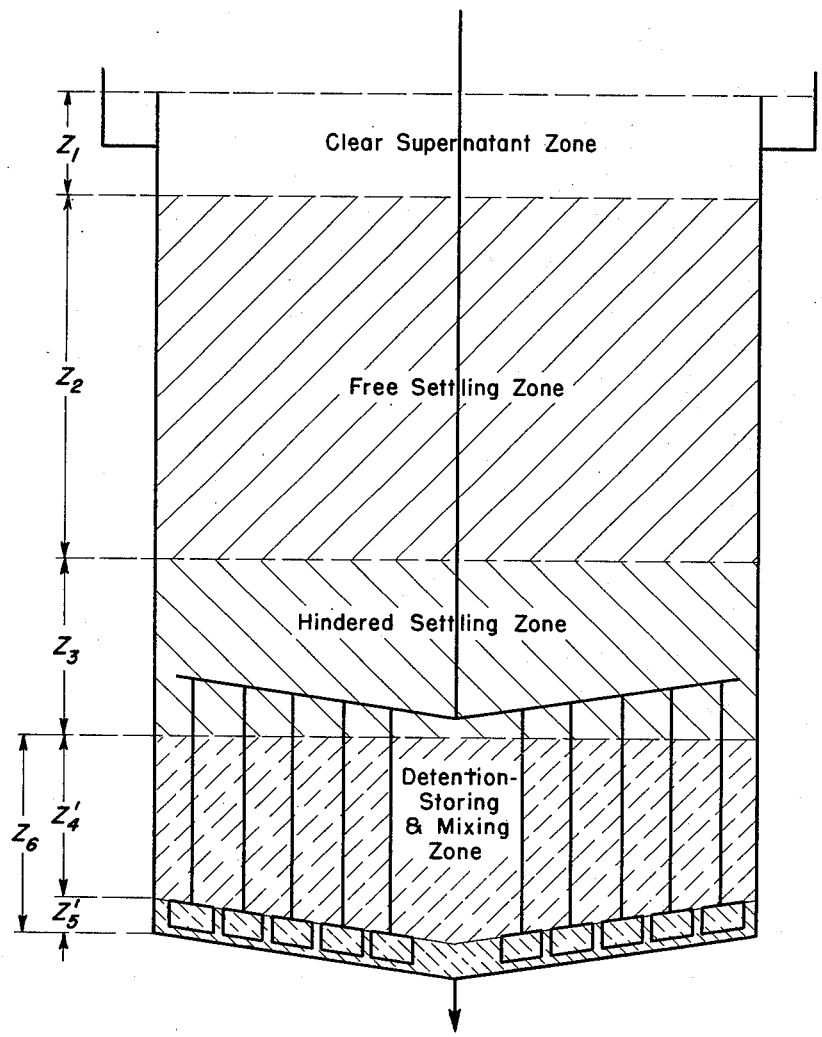

FIGURE 7 is a schematic view illustrating the method of producing the desired filter feed concentrations in a specially controlled super-thickening operation, namely in an additional super-thickening zone.

Figure 8:
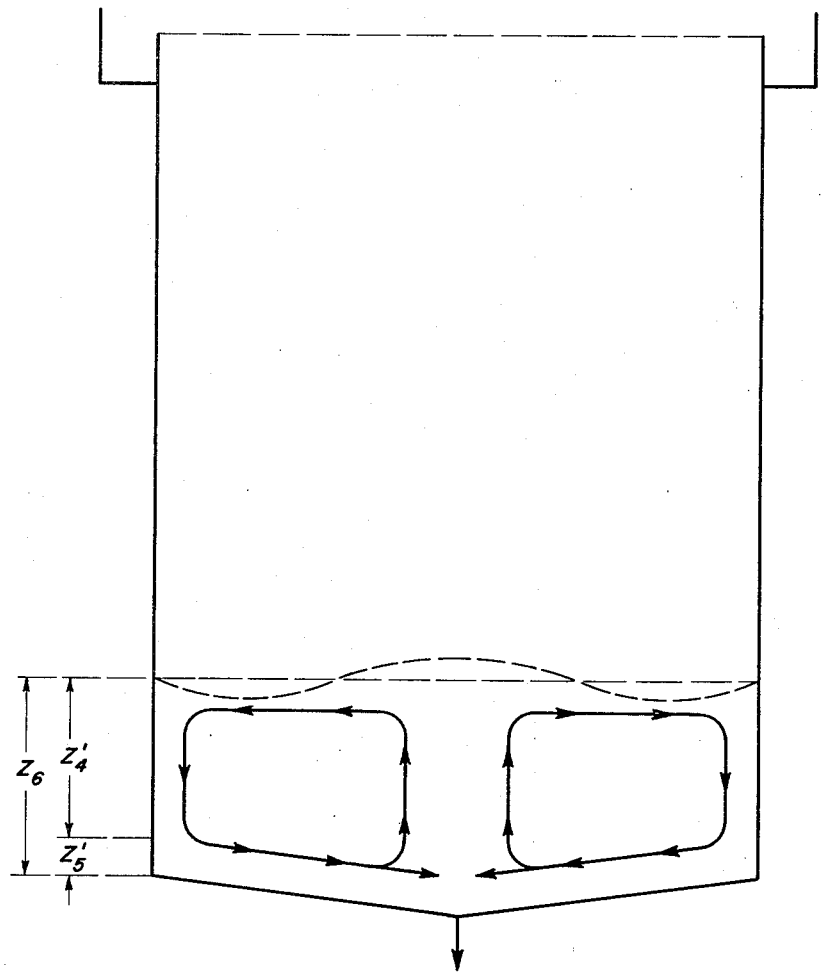

FIGURE 8 is another schematic view supplementary to FIGURE 6, with respect to sludge movements in the super-thickening zone.

Figure 1:
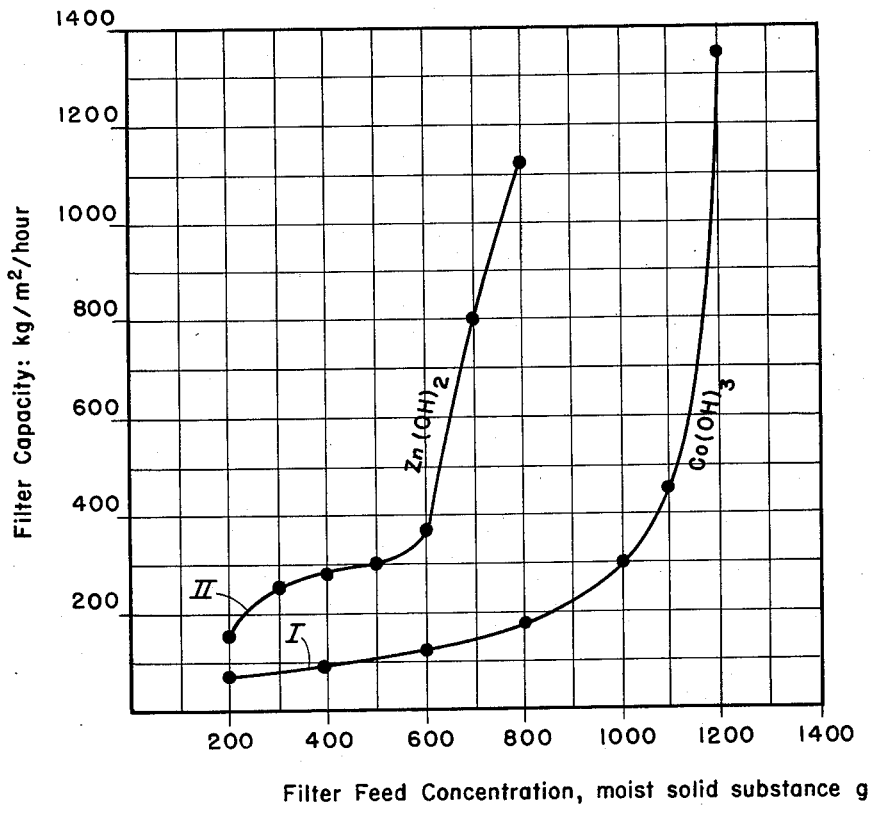
Figure 2:
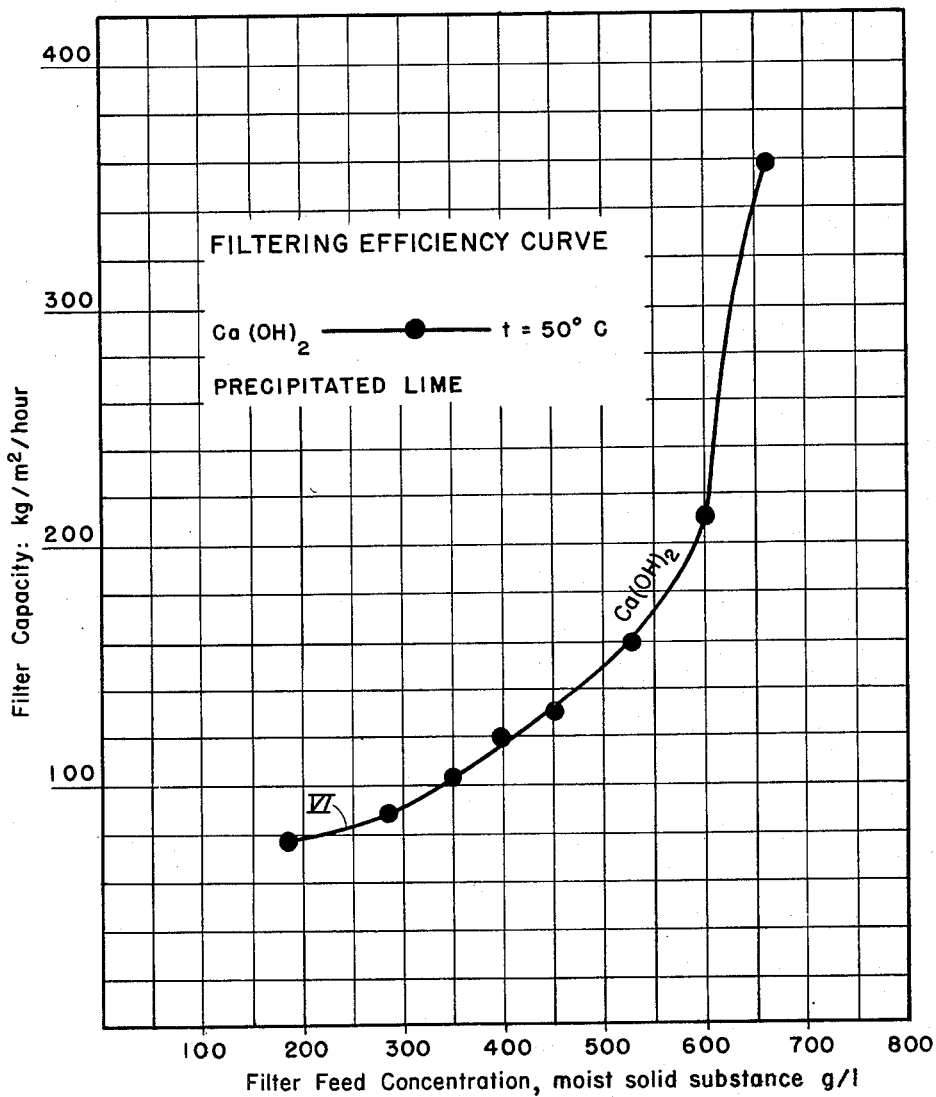
FIGURE 2 shows curve VI being the filtering efficiency curve of a lime sludge precipitated from a calcium chloride solution by means of soda lye, plotted for moist cake substance.
Figure 3:
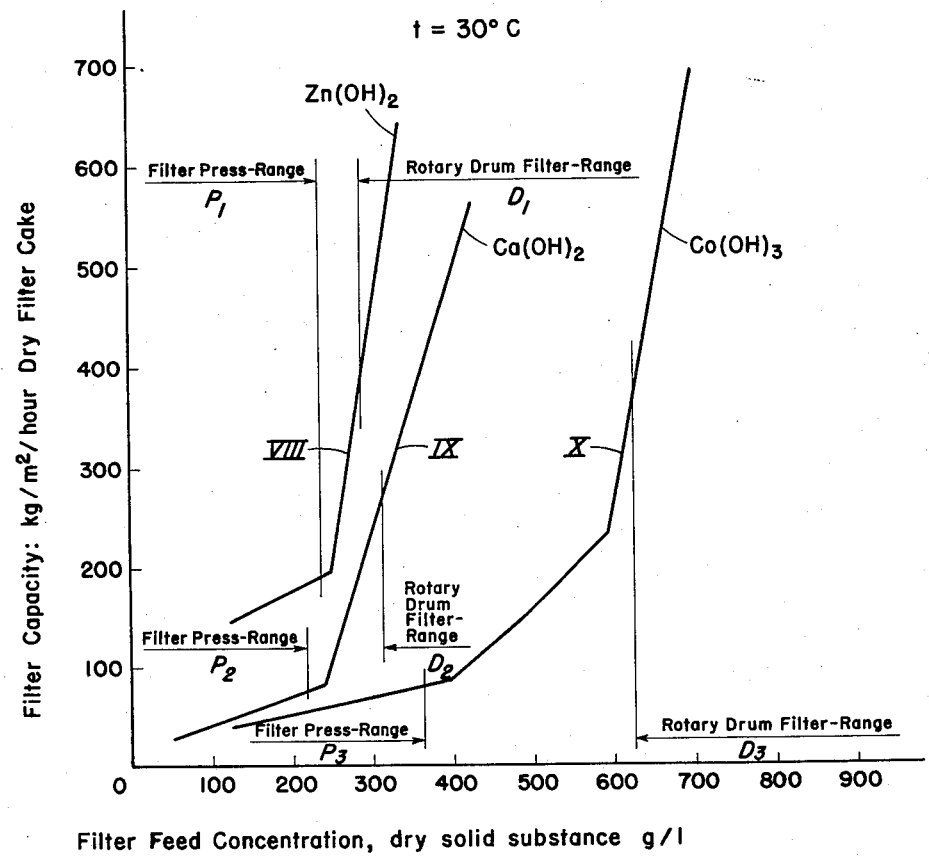
FIGURE 3 shows filtration efficiency curves for certain representative sludges plotted for dry cake substance with contrasting concentration ranges for filter press operation as against concentration ranges for continuous rotary filter operation.

It will be noted that the FIGURE 1 and FIGURE 2 curves have the feed concentration plotted in the usual terms of moist substance from which the dry substance values can be derived at according to the usual moistures in $Zn(OH)_2$ of 58% $H_2O$, in $Ca(OH)_2$ of 60% $H_2O$, and in $Co(OH)_3$ of 50% $H_2O$. The feed concentration in the FIGURE 4 curves is plotted in terms of dry substance obtainable from the foregoing moisture values.

The above moisture values are largely independent of or unaffected by the degree of vacuum or temperature at which the suspension is being subjected to filtration.

As can be seen, each of these curves pass a point at which they begin to steeply ascend. This point read on the abscissa indicates the concentration of incipient critical filterability increase above which the sludge is concentrated in accordance with the invention.

When practicing the filtration process in accordance with this invention, and in conjunction with the specially controlled super-thickening operation above outlined, it is possible to obtain filter cakes of highly concentrated precipitates which have a much lower moisture content than was conventionally obtainable. For example, for an original cobalt hydroxide suspension containing about 30 g./l. moist solid substance, the filter cake obtainable in a conventional manner contains about 70% $H_2O$, whereas after super-thickening to about 1200–1400 g./l. of moist substance the filter cake producible for the practice of this invention contained only about 40% $H_2O$.

Precipitates f.i. $Fe(OH)_3$ containing about 120 g./l. of moist solid substance yield in accordance with conventional processes after filtration, filter cakes with a moisture content of 50–60%. After concentration to 1200 g./l. of moist solid substance in accordance with the invention, filter cakes having a moisture content of only 30–35% are obtained.

The concentration or super-thickening of the solid substance to the concentration of incipient critical filterability increase may be effected with settling or thickening devices in the manner above set forth.

Considerable savings with respect to the filter area, filter cloth, and investments are effected when carrying out the process in accordance with the invention. The filter cakes obtained may be removed from the filter in a simple manner as, for example, by means of scrapers.

The filtration efficiency curves of FIGURES 4, 5 and 6 all plotted for $Zn(OH)_2$, illustrate the fact that for the purpose of this invention, the moisture contents of the filter cake remains relatively constant, that is substantially independent of and unaffected by increases in the feed concentration. With respect to $Zn(OH)_2$ this is substantiated by the following tabulation.

| Zinc Hydroxide Sludge, Temperature 50° C.; Vacuum mm. Hg (=Torr.) | Sludge Moist, g./l. | Percent $H_2O$ of the Filter Cake |
| --- | --- | --- |
| 160 | 300 | 58.0 |
|     | 500 | 56.0 |
|     | 700 | 57.9 |
|     | 800 | 58.0 |
| 260 | 300 | 57.1 |
|     | 500 | 57.6 |
|     | 700 | 58.1 |
|     | 800 | 56.7 |

FIGURE 4 shows a family of filtration efficiency curves for $Zn(OH)_2$ plotted for a filter vacuum of 160 Torr and temperatures of 20° C., 30° C., 40° C., 50° C., and 60° C. respectively.

FIGURE 5 shows a similar family of curves taken over a similar temperature range, although at a filter vacuum of 260 Torr.

FIGURE 6 shows a similar family of curves taken over a similar temperature, although at a filter vacuum of 360 Torr.

These graphs of FIGURES 4, 5 and 6 indicate that the filter capacity (kg./m.$^2$/h.) is influenced to only a very small degree by the temperature of the suspension and by the degree of filter vacuum applied (m./m. Hg). The graphs have the solids concentrations in g./l. moist substance on the abscissa. Capacities are in kg. $Zn(m.^2/h.)$ on the ordinate, with 100 kg. Zn being equivalent to about 400 kg. zinc sludge as moist substance.

Because of this independence of the filter capacity with respect to temperature within the practical range herein considered, it is observed in these graphs that for example, the curves plotted for 30° C. and for 50° C. respectively are located so close with respect to each other, that for practical purposes and within the margin of accuracy no significant change can be observed.

A method for super-thickening such as above referred to, for producing filter feed concentrations desired for the purposes of this invention, will now be outlined by comparison with conventional thickening and by reference to the schematic views of FIGURES 6 and 7.

In the operation of a conventional thickener there is a topmost zone of free settling in which all particles are free falling within the liquid and the settling velocity follows the law of Stokes. Below that zone there is a zone of hindered settling in which the solids and the liquid first move in opposite directions, then become relatively stationary while liquid still moves upwardly in between the particles, until finally both the solids and the liquid no longer move relative to one another. It is in this latter phase of the thickening pattern that conventional thickening operates and where re-mixing and re-suspension may occur of fine particles in the sludge that is normally conveyed by the rotary rakes in a very shallow bottom zone having dilute sludge directly above.

That is to say, in conventional thickening the raking blades operate in a layer of readily flowable sludges such that the mechanism in effect will serve merely to help the sludge move or slide down the inclined tank bottom towards the outlet, thus working on a comparatively very thin layer of sludge when it has attained what prior practice considered final concentration. This is the aforementioned condition of concentration where the particles have attained that state of sedimentation in which they touch one another but will settle no further while having in fact attained that degree of concentration as well as flowability, at which they are inventionally handled by the raking structure and discharged. This relatively thin bottom layer of sludge in conventional operation must be maintained as against a carefully controlled rate of sludge discharge, providing little if any sludge storage capacity. In other words, a relatively thin bottom layer of sludge still sufficiently flowable was accepted as the normal consistency (although dilute as compared with filter cake concentration), if the thickening operation was to proceed continuously and trouble-free.

Since in conventional thickener operation there is practically no storage sludge of discharge density, it necessitates careful control of the sludge discharge rate in accordance with the rate at which sludge is being conveyed by the rotary rakes to the outlet. However, in this phase of the conventional thickening and under the conditions outlined above, re-mixing may occur of five sludge particles of the bottom layer with the more dilute sludge strata above, during conveyance of the sludge over the tank bottom.

By contrast and for the purposes of this invention, the suspension is super-thickened by the addition in the thickener of a super-thickening zone of appreciable and significant depth in addition and subjacent to the conventional sedimentation-thickening pattern above outlined. In this way, there is provided an additional zone for mixing, storage, and detention of the solids, also this provides an operational cushion or buffer, and furthermore an interposed protective zone against re-mixing of sludge particles from the bottom zone with more dilute strata above, as will be presently set forth.

In this super-thickening operation there is employed a rotary raking mechanism in which the raking blades proper are spaced downwardly from the rake arms by means of stems rigidly connecting the blades to the arms. In this way there is interposed between the rake arms and the raking blades proper what may be termed a detention-storing and mixing zone, or else a buffer and protection zone. In this added super-thickening zone the sludge at the bottom is conveyed by the raking blades towards the central storage outlet at a rate significantly greater than that of the sludge discharge with attendant turning over and mixing of the sludge within the super-thickener zone. Referring to FIGURE 7, in the super-thickening zone $Z_6$ there are discernable a mechanical kneading zone $Z'_5$ at the very bottom and above it a mixing and storage zone $Z'_4$. In this way, the zone $Z'_4$ is functionally interposed as a protective zone between the kneading zone $Z'_5$ below, and the conventional hindered settling thickening zone $Z_3$ above. The kneading, with re-arranging of the particles, in zone $Z'_5$ by the blades is effective under the added static pressure of the sludge in $Z'_4$, even while avoiding the re-mixing of super-thickened sludge of the bottom with thin sludges in the zones above.

The disposition of the rotary rake structure is such that the rake arms extend a distance above the tank bottom sufficient to be substantially above or clear of the super-thickening zone $Z_6$.

The following example is given to illustrate the plotting of a filter efficiency curve:

Example

Five hundred cubic centimeters of a cobalt-hydroxide sludge obtained by precipitation of a cobalt chloride solution $Co(OH)_3$ with zinc hydroxide are filtered through a porcelain filter under vacuum until no more filtrate runs out from the filter cake. The moist filter cake is weighed and the weight multiplied by two will give the number of grams of solid substances per liter.

Samples of the substances having different predetermined solid concentrations in grams per liter were prepared from the starting sludge by thickening or concentrating it or by thinning it with appropriate quantities of its mother liquid. The concentration in grams per liter or solid substance was determined as set forth above.

The filtering efficiency for the various samples so prepared having different pre-determined solid substance contents were determined, for example, by means of a hand filter plate of 150 square centimeters which is covered with a large mesh fabric as a base and on top with a muslin cloth or any other filter cloth. The samples of the sludges of the different pre-determined solid content concentrations were sucked through the filters for a definite period of time and thereafter sucked dry. The filtering efficiency per square meter per hour was calculated (according to the examples given above for a continuously working vacuum rotating filter whose filter drum dips ⅓ in the sludge to be filtered) from the ascertained weight of the filter cake of the hand filtered press as follows:

$$\text{Weight of the moist filter cake in kilograms} \cdot \frac{10,000}{150} \cdot \frac{60}{\text{Divided by the filtration time in minutes}} \cdot \frac{1}{3}$$

The solid concentration in grams per liter of the moist sample was then plotted on the curse against the filtering efficiency in kilograms per square meter per hour and the points of the various samples connected to obtain filtering efficiency curve.

The filtration curves presented in FIGURE 4 are plotted for certain metal hydroxide precipitate sludges on the basis of grams per liter of dry solids, to indicate the contrast as between conventional feed concentration ranges requiring the use of batch filter presses, and the new feed concentration ranges enabling the same sludges to be handled on continuous external drum filters.

These curves are characterized substantially by an initial shallow ascending portion, a break, and steeply ascending portion. Thus, the curve VIII for $Zn(OH)_2$ sludge has indicated thereon a tentative filter press operating range $D_1$; the curve IX for $Ca(OH)_2$ has indicated thereon a tentative filter press operating range $P_2$ as against a tentative drum filter operating range $D_2$; the curve X for $Co(OH)_3$ has indicated thereon a tentative filter press operating range $P_3$ as against a tentative drum filter operating range $D_3$.

We claim:

1. The method of filtering suspensions of metal hydroxides of the group comprising $Ca(OH)_2$ and $Zn(OH)_2$, which comprises the steps of thickening said suspension to a sludge having a moist solids content in excess of a lower limit of about 600 grams per liter, where said suspensions while inoperable for continuous vacuum filtration at feed concentrations below said limit, are abruptly rendered continuously vacuum-filterable, and subjecting said thickened sludge to vacuum filtration on a rotary continuous vacuum type filter to produce a filter cake of substantial thickness adapted for continuous discharge from said rotary filter, which cake thickness increases from a point corresponding to said lower limit feed concentration along a steeply rising curve plotted with feed concentration indicated on the abscissa and with weight of filter cake per unit filter area per unit of time indicated on the ordinate.

2. The method of filtering a suspension of a metal hydroxide, namely $Co(OH)_3$, which comprises the steps of thickening said suspension to a sludge having a moist solids content in excess of a lower limit of about 1000 grams per liter, where said suspensions while inoperable for continuous vacuum filtration at feed concentrations below said limit, are abruptly rendered continuously vacuum-filterable, and subjecting said thickened sludge to vacuum filtration on a rotary continuous vacuum type filter to produce a filter cake of substantial thickness adapted for continuous discharge from said rotary filter, which cake thickness increases from a point corresponding to said lower limit feed concentration along a steeply rising curve plotted with feed concentration indicated on the abscissa and with weight of filter cake per unit filter area per unit of time indicated on the ordinate.

References Cited in the file of this patent

UNITED STATES PATENTS

| | | |
|---|---|---|
| 1,873,598 | Jones | Aug. 23, 1932 |
| 1,938,894 | Darby et al. | Dec. 12, 1933 |
| 1,956,420 | Gleason et al. | Apr. 24, 1934 |
| 2,080,346 | Tainton | May 11, 1937 |
| 2,183,896 | Rupp et al. | Dec. 19, 1939 |
| 2,185,785 | Dorr et al. | Jan. 2, 1940 |
| 2,441,584 | McNeill | May 18, 1948 |
| 2,481,110 | Greenawalt | Sept. 6, 1949 |

OTHER REFERENCES

Kolthoff et al.: "Textbook of Quantitative Inorganic Analysis," page 101 only, MacMillan Co., New York, 1947.